(12) United States Patent
Wyatt et al.

(10) Patent No.: US 7,218,245 B2
(45) Date of Patent: May 15, 2007

(54) HEAD-DOWN AIRCRAFT ATTITUDE DISPLAY AND METHOD FOR DISPLAYING SCHEMATIC AND TERRAIN DATA SYMBOLOGY

(75) Inventors: Ivan S. Wyatt, Scottsdale, AZ (US); Thomas M. Leard, Carefree, AZ (US); Jary E. Engels, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 263 days.

(21) Appl. No.: 11/034,582

(22) Filed: Jan. 13, 2005

(65) Prior Publication Data

US 2006/0164262 A1    Jul. 27, 2006

(51) Int. Cl.
*G01C 23/00* (2006.01)
(52) U.S. Cl. .................. 340/973; 340/979; 345/619
(58) Field of Classification Search ............... 340/973, 340/971, 967, 974, 975, 979, 972; 345/618, 345/619; 701/3
See application file for complete search history.

(56) References Cited

U.S. PATENT DOCUMENTS

| | | | |
|---|---|---|---|
| 6,694,249 B1 * | 2/2004 | Anderson et al. | 701/120 |
| 6,798,423 B2 * | 9/2004 | Wilkins et al. | 345/618 |
| 2004/0217883 A1 * | 11/2004 | Judge et al. | 340/946 |
| 2005/0007386 A1 * | 1/2005 | Berson et al. | 345/633 |

* cited by examiner

*Primary Examiner*—Phung T. Nguyen
(74) *Attorney, Agent, or Firm*—Ingrassia Fisher & Lorenz

(57) ABSTRACT

Methods and apparatus are provided for displaying terrain data symbology for an aircraft. The apparatus is a heads-down display for an aircraft having a monitor configured to generate a display and a processor coupled to the display. The display has a centerline. The processor is configured to align the centerline of the display with a track of the aircraft, and generate on the display a first symbol corresponding to a terrain and a second symbol corresponding to an attitude of the aircraft. The processor is further configured to position the first symbol and the second symbol with reference to the track of the aircraft.

18 Claims, 3 Drawing Sheets

HEAD-DOWN AIRCRAFT ATTITUDE DISPLAY AND METHOD FOR DISPLAYING SCHEMATIC AND TERRAIN DATA SYMBOLOGY

FIELD OF THE INVENTION

The present invention generally relates to avionics displays, and more particularly relates to a display of aircraft attitude on a heads-down display.

BACKGROUND OF THE INVENTION

Head-up Displays (HUDs) are typically used in aircraft to provide flight attitude information as referenced with respect to a heading of the aircraft. The term "heading," or heading angle, is referred to herein as an angle associated with a longitudinal axis of the aircraft with respect to north. Primary control symbols presented on HUDs include a Flight Path Vector (FPV) and other earth referenced data such as airports, runways, and the like.

In comparison with HUDs, head-down displays generally have a visually smaller display screen, e.g., smaller in angle subtended at a pilot's eye. Head-down displays also display a wide variety of data that are generally not provided on HUDs. On head-down displays, symbology is generally not displayed overlaying actual outside objects (e.g., mountains, buildings, etc.), such as found with HUDs. Instead, synthetic analogs or enhanced sensor images of actual outside objects may be displayed in head-down displays. For example, flight attitude information may be projected over terrain symbology as if looking out of a cockpit window.

Wind and other forces typically influence an aircraft so that the aircraft heading may not coincide with an actual direction of travel, or track. The term "track," or track angle, is referred to herein as an angle of a ground speed vector with respect to north. For example, track is the direction from north that the aircraft is moving. Most flying conditions encountered by pilots generate a track that is different from a heading of the aircraft. While using a head-down display that is oriented with reference to the heading of the aircraft, such as mimicking HUD, the pilot typically makes numerous flight adjustments to account for the track of the aircraft.

Accordingly, it is desirable to provide a head-down display displaying earth referenced symbology, such as synthetic terrain, that is useful to a flight crew for flight management. In addition, it is desirable to provide a method of displaying earth referenced symbology that will fit on a head-down display and that is useful for flight management and reduces pilot workload. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Apparatus and methods are provided for displaying terrain data symbology in an aircraft. In a first embodiment, the apparatus is a head-down display for an aircraft having a monitor configured to generate a display and a processor coupled to the display. The display has a centerline. The processor is configured to align the centerline of the display with a track of the aircraft, and generate on the display a first symbol corresponding to a terrain, a second symbol corresponding to an attitude of the aircraft, and optionally a third symbol corresponding to a flight path of the aircraft. The processor is further configured to position the first symbol such that terrain objects to which the aircraft is tracking towards are centered with reference to the track of the aircraft. The processor is further configured to center the second symbol and optional third symbol with reference to the track of the aircraft.

In a second embodiment, the apparatus is a head-down display for an aircraft having a track, a heading, and an attitude. The head-down display has a monitor configured to generate a display of a view in front of the aircraft and a processor coupled to the display. The display has a centerline. The processor is configured to determine a maximum offset between the centerline and the track of the aircraft and to determine a hybrid angle between the track and the heading when the difference between the track and the heading exceeds the maximum offset. The processor is further configured to align the centerline of the display with the hybrid angle, and generate on the display a first symbol representing a terrain, a second symbol representing the attitude, and an optional third symbol corresponding to a flight path of the aircraft. The processor is further configured to position the first symbol such that terrain objects to which the aircraft is tracking towards are centered with reference to the track of the aircraft, the second symbol aligned with the center of the display, and the optional third symbol with reference to the track of the aircraft.

In a third embodiment, a method for displaying information on a display for an aircraft, the aircraft having a track, a heading, and an attitude, has the steps of: selecting an angle, the angle substantially equal to the track or between the track and the heading; aligning a centerline of the display with the angle; generating a first symbol on the display, the first symbol corresponding to a terrain; generating a second symbol on the display, the second symbol corresponding to the attitude; and, centering the first symbol and the second symbol with reference to the angle.

In a fourth embodiment, a program product for a display of an aircraft, the aircraft having a track, a heading, and an attitude, has an avionics display program executable to: select an angle, the angle equal to the track or between the track and the heading; center a display with the angle; and, generate on the display a first symbol representing a terrain and a second symbol representing the attitude. The program is further executable to center the first symbol and the second symbol with reference to the angle.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
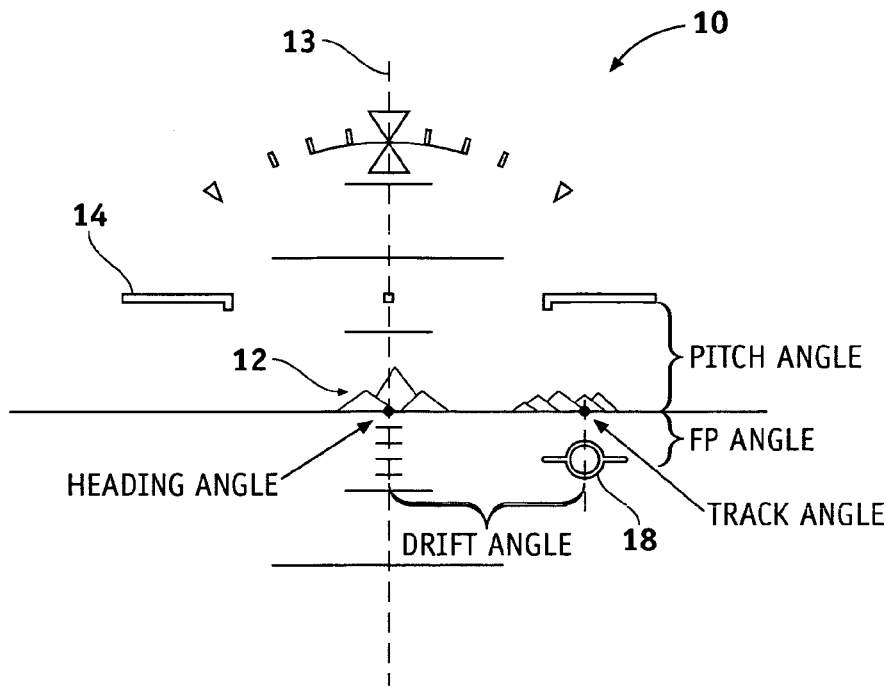
FIG. 1 is a diagram illustrating a conventional head-down display.

Referring to the drawings, FIG. 1 is a diagram illustrating a typical head-down display 10 with terrain and flight path representations. The display 10 is referenced with respect to a heading angle of an aircraft, and terrain symbology 12 is presented that represents a variety of terrain as viewed along the heading of the aircraft (e.g., out of the aircraft cockpit in front of the nose of the aircraft). This conventional head-down display 10 simulates a view as seen using a HUD, e.g., the head-down display 10 provides a view that is aligned with the heading of the aircraft.

The heading angle is positioned and aligned with a centerline 13 of the display 10, and a symbol 14 representing an attitude of the aircraft is shown with reference to the heading angle. The attitude symbol 14 indicates a pitch angle and a roll angle. The term "pitch angle," or pitch, is referred to herein to indicate an angle of the longitudinal axis of the aircraft with respect to the local level. The term "roll angle," or roll, is referred to herein to indicate an angle of the lateral axis of the aircraft with respect to the local level. For example, the attitude symbol 14 may depict the aircraft wings as one or more horizontal marks. With respect to a horizon line rendered on the display 10, the attitude symbol 14 displace up and down in response to changes in the pitch of the aircraft. Similarly, the attitude symbol 14 rotates with respect to the horizon line in response to changes in the roll of the aircraft.

A flight path symbol 18 is also displayed and indicates a track angle, a flight path angle, and a drift angle with respect to the heading angle. The term "flight path angle" is referred to herein to indicate an angle of a total velocity vector with respect to a local level. For example, the flight path angle indicates an elevation angle of the aircraft flight path. The term "drift angle," or drift, is referred to herein to indicate a resultant angle of the track minus the heading.

Figure 2:
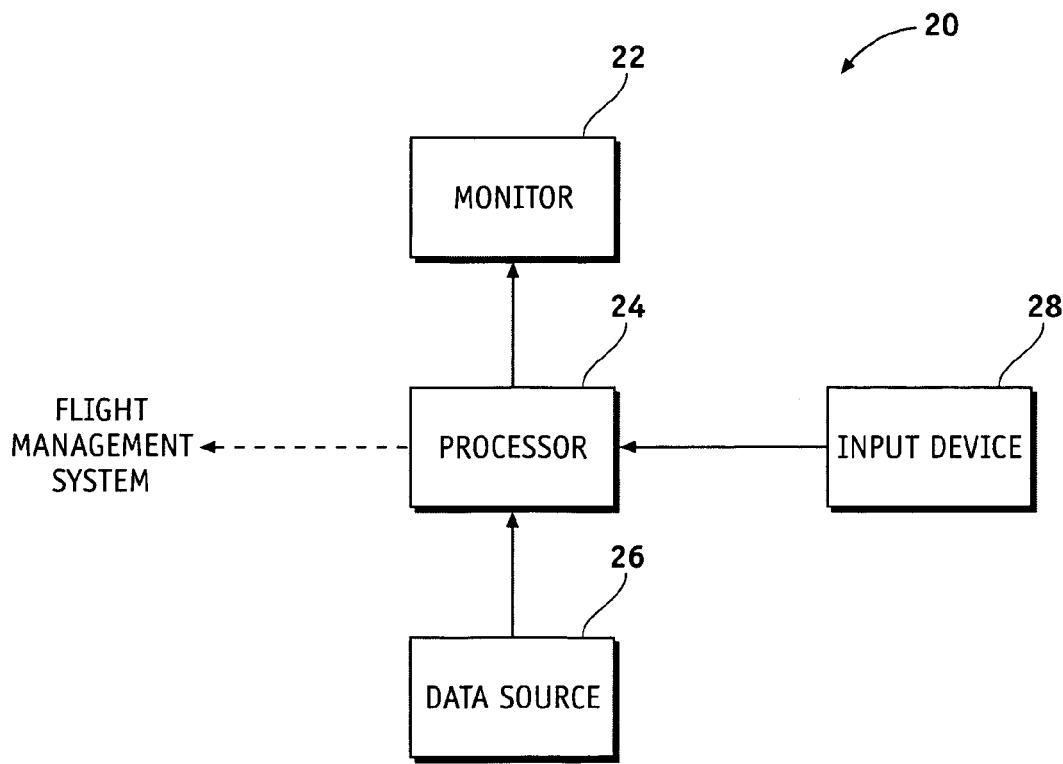
FIG. 2 is a schematic diagram illustrating an exemplary embodiment of a head-down display system in accordance with the present invention.

FIG. 2 is a schematic diagram illustrating an exemplary embodiment of a head-down display system 20 in accordance with the present invention. Although the present invention is described in terms of functional block diagrams, those of skill in the art will appreciate that such functional blocks may be realized in many different forms of hardware, firmware, and/or software components configured to perform the various functions. For example, the present invention may employ various integrated circuit components, e.g., memory elements, digital signal processing elements, look-up tables, and the like, which carry out a variety of functions under the control of one or more microprocessors or other control devices. Such general techniques are known to those skilled in the art and are not described in detail herein.

The head-down display system 20 includes a monitor 22, a processor 24 connected to the monitor 22 that controls the images displayed thereon to form a display, one or more data sources 26 connected to the processor 24, and optionally an input device 28 connected to the processor 24. Other display elements may be coupled with the head-down display 20. For example, the head-down display 20 may be incorporated with a multi-function display (MFD) system, a primary flight display (PFD), or the like. The head-down display 20 is configured for use in a commercial aircraft or any vehicle in which navigational aids, including airways, very high frequency (VHF) Omnirange stations (VORs), radio stations or non-directional beacons (NDBs), airports, and/or relative position information may be displayed.

A number of aspects of the monitor 22 (which are controlled by the processor 24 in a practical embodiment) contribute to the improved contents and appearance of the heads-down display to increase the situational and navigational awareness of the pilot and/or flight crew. Image generation and display aspects of the display system 20 leverage known techniques such that existing avionics displays can be modified in a straightforward manner to support the different features described herein. In a practical implementation, the concepts described herein are realized in the form, for example, of a revised display generation software or processing resident at the processor 24.

In one exemplary embodiment, the display system 20 provides an attitude display. The data sources 26 include, by way of example and not of limitation, databases, on-board sensors, and the like, that provide static and real-time information. For example, databases of terrain data may be connected to the processor 24 for retrieval of information to display various terrain symbology on the display. Additionally, the on-board sensors provide real-time flight information (e.g., airspeed, altitude, heading, track, etc.) to the processor 24. The data sources 26 may take the form of a variety of conventional avionics devices such as memory elements, look-up tables, instrument outputs (e.g., radar), and processors such as may operate within a display system or a flight management system. In general, a user (e.g., a pilot) located within the aircraft provides input to the processor 24 through the input device 28 and receives visual feedback regarding the status of the aircraft via the display produced by monitor 22. The processor 24 communicates with the input device 28 through which a pilot or crewmember can provide inputs to the display system 20 or an associated MFD system. The input device 28 may be, for example, a hand input device such as a mouse or a track-ball, a keyboard, or any device which allows a user to point to or select an item on the display.

The processor 24 encompasses one or more functional blocks used to provide a flight management, navigational, and positional interface with the pilot, and input to monitor 22. The processor 24 may include or cooperate with a mode, position, and/or detection element that is capable of determining the mode or position of the aircraft relative to one or more reference locations, points, planes, or navigation aids. For example, a conventional guidance system, gyroscope, global positioning system (GPS), inertial reference system (IRS), or the like, may interface with the processor 24 to provide attitude and direction information of the aircraft. In addition, the processor 24 may be configured to receive, analyze, condition, and process navigation and positional information associated with the aircraft. In this regard, the processor 24 may include any number of individual microprocessors, flight computers, navigation equipment, memories, storage devices, interface cards, and other standard components known in the art.

Additionally, the processor 24 may include any number of microprocessor elements, memory elements, power supplies, and other functional components as necessary to support the operation thereof. In this respect, the processor 24 may include or cooperate with any number of software programs or instructions designed to carry out various methods, process tasks, calculations, control functions, and generation of display signals and other data used by the monitor 22.

The processor 24 may also be configured to receive and process other flight data such as navigational and/or bearing data related to an intended destination of the aircraft. In a practical commercial aircraft application, such data may be associated with specific waypoints, an airport, navigational aids, or the like. The processor 24 may process data and generate appropriate signals to the monitor 22 such that monitor 22 generates symbols or indicia representative of the appropriate terrain, navigational or airport information, or the like. Such processors and flight control computers are available from a number of manufacturers such as Honeywell International Inc. In one exemplary embodiment, the processor 24 is incorporated with a flight management system (FMS) or another avionics component which, inter alia, formats navigation data and forwards the data to the monitor 22 for display as data.

The monitor 22 may include any display monitor suitable for displaying the various symbols and information detailed herein. Many currently known monitors are suitable for this task, including various cathode ray tube (CRT) and flat-panel display systems. In an exemplary embodiment, the monitor 22 includes a flat-panel display or the like. The display suitably includes various graphical elements associated with the surrounding environment of the aircraft including the location of terrain. Various navigational aids may also be included such as graphical elements representing VHF Omnirange stations, non-directional beacons, radio stations, and the like, and airports, airways, special use airspace, and other aircraft.

Figure 3:
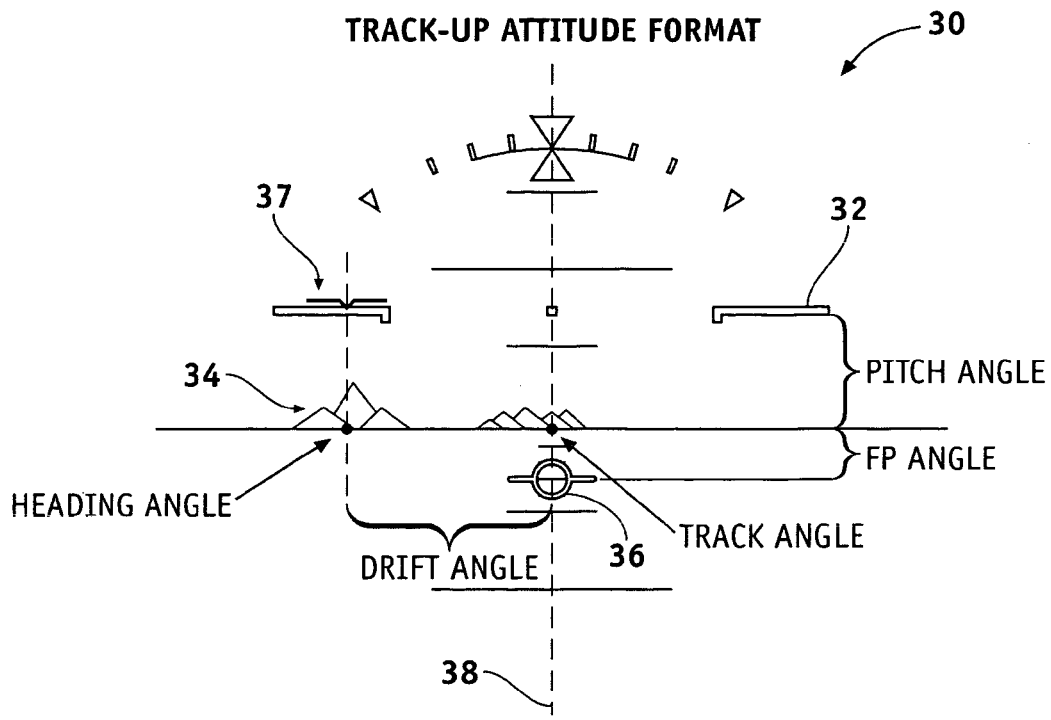
FIG. 3 is a diagram illustrating a view of a head-down display in accordance with a first embodiment of the present invention.

FIG. 3 is a diagram illustrating a view of a head-down display 30 in accordance with a first embodiment of the present invention. In this exemplary embodiment, the head-down display 30 is in a "track-up" configuration. The head-down display 30 includes a symbol 32 representing the attitude of the aircraft. The attitude symbol 32 is constrained to a centerline 38 of the display 30, such as a centered vertical line. The attitude symbol 32 may further indicate the pitch angle, drift angle, and roll angle (not shown) of the aircraft. Earth referenced symbology 34, such as terrain, is also displayed on the head-down display 30 and is referenced with respect to a view along the track angle of the aircraft. For simplicity of discussion, the term "terrain" is referenced hereinafter to include earth referenced subjects including, but not limited to, ground and structures located on the ground, airports, airfields, and the like.

A flight path symbol 36 may also be generated on the display 30 that is laterally aligned with the track angle to indicate the flight path angle of the aircraft. In one exemplary embodiment, the display of the terrain symbology 34 on the head-down display 30 has the appearance of laterally translating the terrain symbology 12 shown in FIG. 1 to center the track of the aircraft in the display 30 and generate the view referenced along the track angle of the aircraft as aligned with the centerline 38 of the display 30. As best shown in FIG. 3, the heading angle is also translated on the display 30 with respect to the track angle. A heading symbol 37 is optionally displayed on the head-down display 30 to indicate the heading of the aircraft. As the aircraft tracks towards terrain objects, such terrain objects are centered on the head-down display 30 with reference to the track of the aircraft.

Figure 4:
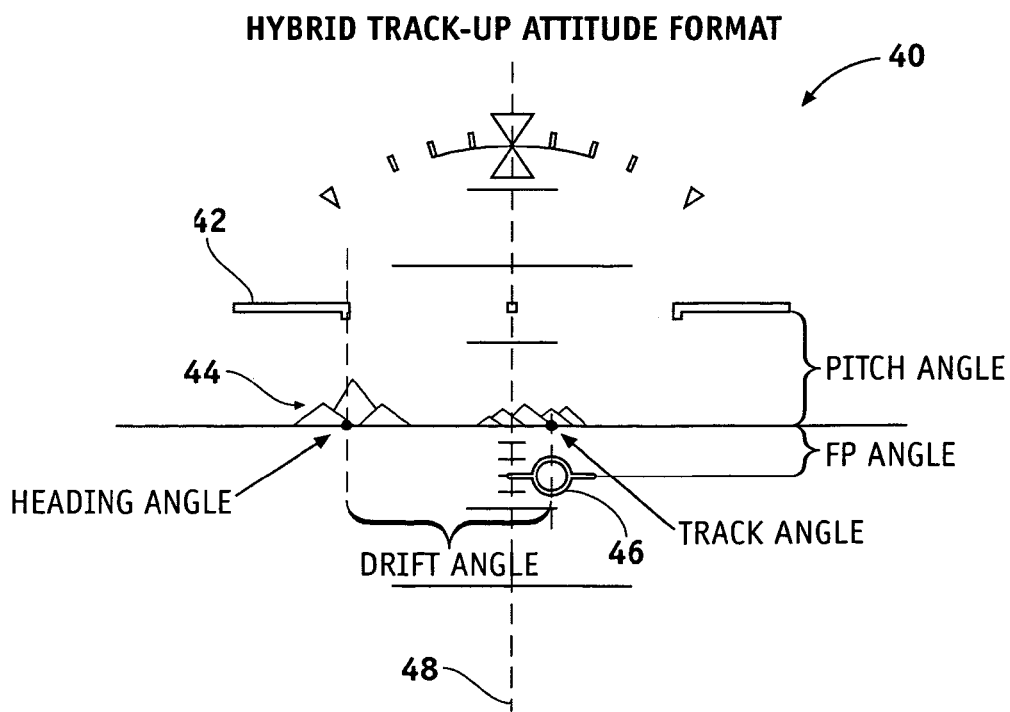
FIG. 4 is a diagram illustrating a view of a head-down display in accordance with a second embodiment of the present invention.

FIG. 4 is a diagram illustrating a view of a head-down display 40 in accordance with a second embodiment of the present invention. In this exemplary embodiment, the head-down display 40 is in a "hybrid track-up" configuration. The head-down display 40 includes a symbol 42 representing the attitude of the aircraft. The attitude symbol 42 is constrained to the centerline 48 of the display 40, such as a centered vertical line. Earth referenced symbology 44, such as terrain, airports, and airfields, is also displayed on the head-down display 40 and is referenced with respect to a view along an angle between the heading angle and the track angle of the aircraft. In one exemplary embodiment, the centerline 48 of the display 40 is laterally centered with respect to the angle resulting from displacing the track angle by a hybrid display angle in the direction of the heading angle. The hybrid display angle is determined from a range of angles, from substantially equal to the drift angle to a pre-determined limit, and the display 40 is laterally centered at this angle as best shown in FIG. 4. The attitude symbol 42 may further indicate the pitch angle and roll angle of the aircraft.

A flight path symbol 46 may also be generated on the display 40 that is laterally aligned with the track angle to indicate the flight path angle of the aircraft. In one exemplary embodiment, the display of the terrain symbology 44 on the head-down display 40 has the appearance of laterally translating the terrain symbology 32 shown in FIG. 3 to center the hybrid display angle in the display 40 and generate the view referenced along the hybrid display angle as aligned with the centerline 48 of the display 40. A heading symbol (not shown) may optionally be displayed on the head-down display 30 to indicate the heading of the aircraft with respect to the terrain symbology. In this exemplary embodiment, the offset of the attitude symbol 42 from the flight path symbol 46 may be used to convey to the flight crew a relative position of the terrain, such as may be viewed out of the cockpit, based on the terrain as rendered on the display 40.

Figure 5:
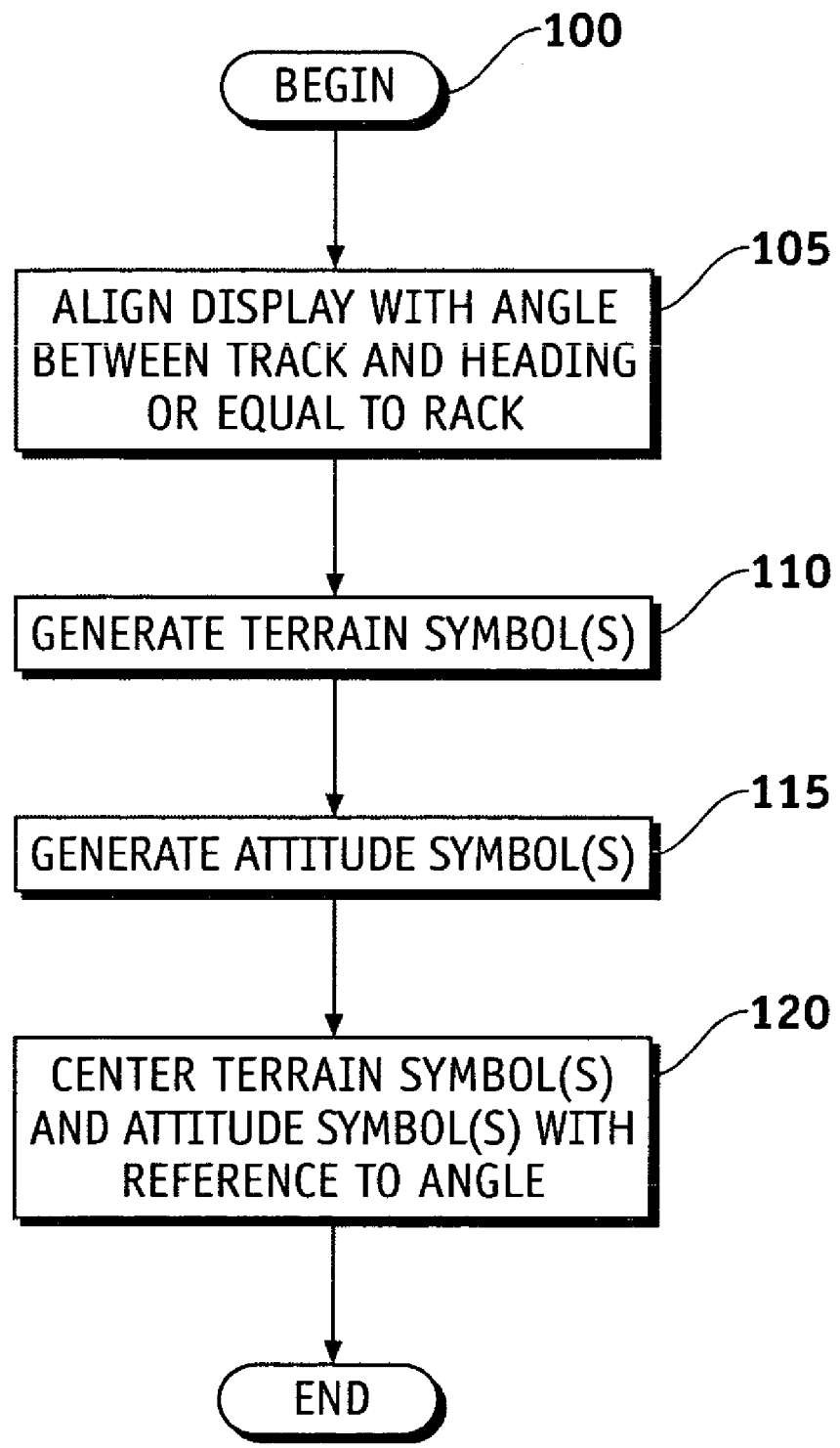
FIG. 5 is a flow diagram illustrating an exemplary embodiment of a method for displaying information on a display of an aircraft in accordance with the present invention.

FIG. 5 is a flow diagram illustrating an exemplary embodiment of a method for displaying information on a display of an aircraft. Although the present invention is described in terms of various processing steps, those of skill in the art will appreciate that the exemplary process illustrated may include additional or fewer steps or may be performed in the context of a larger processing scheme. Furthermore, the various methods presented in the drawing Figures or the specification are not to be construed as limiting the order in which the individual processing steps are performed. The method begins at step 100.

The centerline of the display, such as the centerline 38 of the track-up head-down display 30 shown in FIG. 1 or the centerline 48 of the hybrid track-up head-down display 40, is aligned with a selected angle that is equal to the track of the aircraft or an angle between the track and the heading of the aircraft at step 105. For example, in the track-up configuration, the selected angle is the track angle of the aircraft. In the hybrid track-up configuration, the selected angle is between the track angle and the heading angle of the aircraft. Depending on the particular display configuration, a processor, such as the processor 24 shown in FIG. 2, orients the symbology generated on the display for a track-up configuration or a hybrid track-up configuration. The processor 24 (FIG. 2) retrieves or receives data regarding earth referenced symbology, such as terrain, airports, runways, and the like, from a data source, such as the data source 26 shown in FIG. 2.

A monitor, such as the monitor 22 shown in FIG. 2, generates earth referenced symbology on the display, such as the terrain symbology 34 shown in FIG. 3 or the terrain symbology 44 shown in FIG. 4, at step 110 based on the data retrieved by the processor 24 (FIG. 2). Depending on the particular display configuration, the terrain symbology is generated on the display by the monitor 22 with reference to the selected angle.

The monitor 22 (FIG. 2) generates an attitude symbol on the display, such as the attitude symbol 32 shown in FIG. 3 or the attitude symbol 42 shown in FIG. 4, at step 115 based on the data retrieved by the processor 24 (FIG. 2) relating to the attitude of the aircraft. The attitude symbol is generated by the monitor 22 (FIG. 1) with reference to the selected angle. In one exemplary embodiment, the attitude symbol is aligned with the center of the display. In another exemplary embodiment, the attitude symbol is offset based on the drift or hybrid angles.

The earth referenced symbology and attitude symbol are positioned on the display with reference to the selected angle at step 120. For example, in a track-up configuration, the terrain symbology is generated by the monitor 22 (FIG. 2) on the display to simulate the view in front of the aircraft along the track angle. In a hybrid track-up configuration, the terrain symbology is generated by the monitor 22 (FIG. 2) on the display to simulate the view in front of the aircraft along the selected angle that is between the track angle and the heading angle. In either the track-up configuration or the hybrid track-up configuration, the attitude symbol is laterally centered with the centerline of the display which is aligned with the selected angle, as previously mentioned with respect to step 105. Positioning of the earth referenced symbology and attitude symbol, as well as other elements shown on the display, is determined by the processor 24 (FIG. 2) based on the flight data and selected angle.

A flight path symbol, such as the flight path symbol 36 shown in FIG. 3 or the flight path symbol 46 shown in FIG. 4, may optionally be generated by the monitor 22 (FIG. 2) on the display. The flight path symbol is laterally aligned on the display by the monitor 22 (FIG. 2) with the track angle of the aircraft. As previously mentioned, the flight path symbol may also indicate the flight path angle. Additionally, a heading symbol, such as the heading symbol 37 shown in FIG. 3, may also be generated by the monitor 22 (FIG. 2) on the display. In one exemplary embodiment, the processor 24 (FIG. 2) obtains data from the data source 26 (FIG. 2) regarding the heading and flight path of the aircraft and communicates with the monitor 22 (FIG. 2) to generate the flight path symbol and heading symbol. As previously mentioned, the data source 26 (FIG. 2) may provide static information, such as from a database, and real-time information, such as from on-board sensors. Additional data may also be retrieved by the processor 24 (FIG. 2) depending on a desired content to be displayed on the display, such as navigational beacon data, and corresponding symbology may be generated by the monitor 22 (FIG. 2) on the display as controlled by the processor 24 (FIG. 2).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A head-down display for an aircraft having a track and an attitude, said head-down display comprising:
   a monitor configured to generate a display having a centerline; and
   a processor coupled to said monitor and configured to:
      align said centerline of said display with the track of the aircraft; and
      generate on said display:
         a first symbol corresponding to a terrain; and
         a second symbol corresponding to the attitude of the aircraft, said processor further configured to position said first symbol and said second symbol with reference to the track of the aircraft.

2. A head-down display according to claim 1, wherein said processor is further configured to generate on said display a third symbol corresponding to a heading of the aircraft.

3. A head-down display according to claim 1, wherein said processor is further configured to laterally align said display with said track of the aircraft and laterally center on said display said first symbol and said second symbol with said track of the aircraft.

4. A head-down display according to claim 3, wherein said processor is further configure to:
   generate on said display a third symbol corresponding to a flight path of the aircraft; and
   laterally center on said display said third symbol with said track of the aircraft.

5. A head-down display according to claim 4, wherein said processor is further configured to position said second symbol with respect to a pitch of the aircraft and a roll of the aircraft.

6. A head-down display system for an aircraft having a track, a heading, and an attitude, said head-down display system comprising:
   a monitor configured to generate a display of a view in front of the aircraft, said display having a centerline; and
   a processor coupled to said monitor and configured to:
      determine a maximum offset between said centerline and the track;
      determine a hybrid angle, said hybrid angle equal to or less than said maximum offset and between the track and the heading;
      align said centerline of said display with said hybrid angle; and
      generate on said display:
         a first symbol representing a terrain as viewed in front of the aircraft, said processor further configured to position said first symbol with reference to the track; and
         a second symbol representing the attitude, said processor further configured to align said second symbol with reference to said centerline.

7. A head-down display system according to claim 6, wherein the aircraft has a flight path; and
   wherein said processor is further configured to:
      generate on said display a third symbol representing the flight path; and
      position said third symbol with reference to the track.

8. A head-down display system according to claim 6, wherein said processor is further configured to generate on said display a third symbol representing the heading and position said third symbol with reference to the track.

9. A method for displaying information on a display of an aircraft, the aircraft having a track, a heading, and an attitude, said method comprising the steps of:

aligning a centerline of the display with an angle, the angle equal to the track or between the track and the heading;

generating a first symbol on the display, the first symbol corresponding to a terrain;

generating a second symbol on the display, the second symbol corresponding to the attitude; and centering the first symbol and the second symbol with reference to the angle.

10. A method for displaying information on a display according to claim 9 further comprising the step of generating a third symbol on the display, the third symbol corresponding to the heading of the aircraft.

11. A method for displaying information on a display according to claim 9, wherein said centering step comprises laterally centering the first symbol and the second symbol with the angle.

12. A method for displaying information on a display according to claim 11 further comprising the steps of:

generating a third symbol on the display, the third symbol corresponding to a flight path of the aircraft; and laterally centering the third symbol with the track of the aircraft.

13. A program product for a display of an aircraft, the aircraft having a track, a heading, and an attitude, said program product comprising:

an avionics display program executable to:

select an angle, said angle equal to the track or between the track and the heading;

center the display with reference to said angle; and generate on the display:

a first symbol representing a terrain as viewed in front of the aircraft; and a second symbol representing the attitude, said program further executable to center said first symbol and said second symbol with reference to said angle.

14. A program product according to claim 13, wherein said avionics display program is executable to further generate on said display a third symbol representing the heading.

15. A program product according to claim 13, wherein said avionics display program is executable to laterally center said first symbol and said second symbol with said angle.

16. A program product according to claim 15, wherein the aircraft has a flight path; and wherein said avionics display program is executable to:

generate a third symbol on said display representing the flight path; and laterally align said third symbol with the track.

17. A program product according to claim 16, wherein the aircraft has a pitch and a roll; and wherein said avionics display program is executable to:

position said second symbol with respect to the pitch and the roll; and position said third symbol with respect to the roll.

18. A program product according to claim 13, wherein said avionics display program is executable to select said angle based on a user selection.

* * * * *